US007916084B2

(12) United States Patent
Dutruc

(10) Patent No.: US 7,916,084 B2
(45) Date of Patent: Mar. 29, 2011

(54) EMERGENCY BEACON

(75) Inventor: Hervé Dutruc, Ensues la Redonne (FR)

(73) Assignee: Eurocopter, Marignane Codex (FR)

( * ) Notice: Subject to any disclaimer, the term of this patent is extended or adjusted under 35 U.S.C. 154(b) by 307 days.

(21) Appl. No.: 12/171,310

(22) Filed: Jul. 11, 2008

(65) Prior Publication Data
US 2009/0027269 A1   Jan. 29, 2009

(30) Foreign Application Priority Data

Jul. 12, 2007 (FR) .................................. 07 05039

(51) Int. Cl.
G01S 1/00 (2006.01)
(52) U.S. Cl. ......................... 342/385; 340/981; 340/945
(58) Field of Classification Search .................. 340/981, 340/945; 342/385
See application file for complete search history.

(56) References Cited

U.S. PATENT DOCUMENTS

| 3,354,395 | A | * | 11/1967 | Merck et al. | 342/385 |
| 3,978,410 | A | * | 8/1976 | Fletcher et al. | 455/96 |
| 4,630,289 | A | * | 12/1986 | Wren | 340/981 |
| 5,394,142 | A | * | 2/1995 | Dusart | 340/981 |
| 5,425,076 | A | * | 6/1995 | Knippelmier | 379/27.04 |
| H1560 | H | * | 7/1996 | Gill et al. | 340/981 |
| 6,208,269 | B1 | * | 3/2001 | Brodie et al. | 455/3.01 |
| 6,260,508 | B1 | * | 7/2001 | Morse | 340/981 |
| 6,275,164 | B1 | * | 8/2001 | MacConnell et al. | 340/692 |
| 6,324,393 | B1 | * | 11/2001 | Doshay | 340/438 |
| 6,411,260 | B1 | * | 6/2002 | Weglarz et al. | 343/722 |
| 6,943,700 | B2 | * | 9/2005 | Ceccom et al. | 340/945 |
| 7,162,395 | B1 | * | 1/2007 | Holmes et al. | 702/188 |
| 2006/0022882 | A1 | | 2/2006 | Gerder et al. | |

FOREIGN PATENT DOCUMENTS

JP    11 177462 A      7/1999
JP    11-177462 A  *   7/1999

* cited by examiner

Primary Examiner — Eric M Blount
(74) Attorney, Agent, or Firm — Brooks Kushman P.C.

(57) ABSTRACT

An emergency beacon includes a housing fitted with a connector for connecting the beacon to an antenna that is external to the housing. Inside the housing, the beacon includes an incident sensor, a transmitter, a detection and control member connected to the sensor and transmitter and arranged to trigger operation of the transmitter when an incident is detected. The beacon further includes, inside the housing, an incorporated antenna, a changeover switch interposed between the transmitter and the connector and also interposed between the transmitter and the incorporated antenna, and a sensitive member sensitive to the electromagnetic power conveyed towards the connector and to the electromagnetic power returned by the connector. The sensitive member is connected to the control member which is connected to the changeover switch and is programmed to deliver the signals from the transmitter to the external or incorporated antenna, depending on the state of the sensitive member.

6 Claims, 2 Drawing Sheets

EMERGENCY BEACON

The present invention relates to an improved emergency beacon for rotorcraft and other aircraft.

The technical field of the invention is that of fabricating rotorcraft.

BACKGROUND OF THE INVENTION

The present invention relates more particularly to an emergency beacon adapted to be fitted to an aircraft provided with an antenna and to be connected to said antenna.

It is known to fit a helicopter with an antenna that is secured to the fuselage and that is connected to a radio transmitter, as described for example in patent FR 2 743 198.

In particular, it is known to fit a helicopter with an emergency beacon comprising a housing fitted with a connector and containing a radio transmitter and a connection member connecting the transmitter to the connector, the connector enabling the beacon, and its transmitter, to be connected either to an antenna that is secured to the helicopter, or else to a portable auxiliary antenna.

That enables a person on board the helicopter, after an accident that has damaged the antenna secured to the helicopter, to connect the beacon to the auxiliary antenna, and where appropriate to take the beacon and the auxiliary antenna away from the helicopter so as to trigger or maintain transmission of an emergency radio signal by the beacon.

The transmitter of the beacon can be activated as a result of an incident, such as an impact, being detected by a circuit that is connected to an impact sensor incorporated in the beacon, and/or can as a result of a human being taking manual action on a trigger member incorporated in the beacon, such as a switch.

U.S. Pat. No. 6,411,260 describes an antenna for an emergency beacon that is designed to transmit distress signals at three radio frequencies, i.e. 121.5 megahertz (MHz), 243 MHz, or 406.025 MHz.

Patent No. FR 2 660 093 describes a power supply device for a beacon that transmits at 406.025 MHz.

Patent Nos. FR 2 776 391, FR 2 873 451, and JP 11 177 462 describe other characteristics and uses for emergency beacons.

Emergency beacons for aircraft present drawbacks.

In particular in the event of the aircraft crashing, the antenna secured to the aircraft, the auxiliary cable, the cable (s) connecting said antenna(s) to the transmitter, and/or the connector incorporated in the housing of the beacon can break or be damaged, which can limit or prevent the transmission of a distress signal.

Furthermore, in particular in the event of a crash causing the antenna that is secured to the aircraft breaking (or breaking its connection with the transmitter), any survivors might be unable to recover the beacon and the portable auxiliary antenna, and/or unable to connect them together so as to cause the beacon to transmit.

OBJECTS AND SUMMARY OF THE INVENTION

An object of the invention is to remedy that problem.

An object of the invention is to provide an aircraft emergency beacon that is improved and that remedies, at least in part, the shortcomings or drawbacks of previously-known emergency beacons for aircraft.

In an aspect of the invention, an emergency beacon is proposed that comprises a housing fitted with a connector for connecting the beacon to an antenna external to the housing, the beacon including, inside the housing:

- a sensor that is sensitive to an incident such as an impact or immersion;
- a transmitter;
- a detection and control member that is connected to the sensor and to the housing and that is arranged to trigger operation of the transmitter in the event of an incident being detected;
- an incorporated antenna;
- a changeover switch interposed between the transmitter and the connector, and also between the transmitter and the incorporated antenna; and
- a sensitive member that is sensitive to the electromagnetic power Pi transmitted (by the transmitter) and conveyed (through the changeover switch) to the connector, and to the electromagnetic power Pr returned by the connector, i.e. that is sensitive to the impedance match between the external antenna and the transmitter, which sensitive member is connected to or incorporated in the detection and control member, and is preferably disposed between the changeover switch and the connector;
- the detection and control member being connected to the changeover switch and being arranged (in particular programmed) to cause the signals provided by the transmitter to be delivered to the external antenna or else to the incorporated antenna, depending on the state of the sensitive member.

In preferred embodiments of the invention:

- the detection and control member is arranged to monitor the state of the sensitive member at regular time intervals after an incident has been detected;
- the sensitive member is sensitive to the voltage standing wave ratio VSWR in a transmission line connecting an outlet of the changeover switch to the connector;
- the detection and control member is arranged to compare the VSWR to a determined value, at regular time intervals after an incident has been detected;
- the detection and control member is arranged to keep the state or position (pos1, pos2) of the changeover switch unchanged for a determined duration (time1, time2);
- the incorporated antenna may be a slot antenna; and
- the transmitter is arranged to transmit signals at one or more frequencies, and in particular at two or three frequencies, particularly at least one of the following frequencies: 121.5 MHz; 243 MHz; and 406.025 MHz.

BRIEF DESCRIPTION OF THE DRAWINGS

Other aspects, characteristics, and advantages of the invention appear from the following description given with reference to the accompanying drawings that show preferred embodiments of the invention without any limiting character.

MORE DETAILED DESCRIPTION

Figure 1:
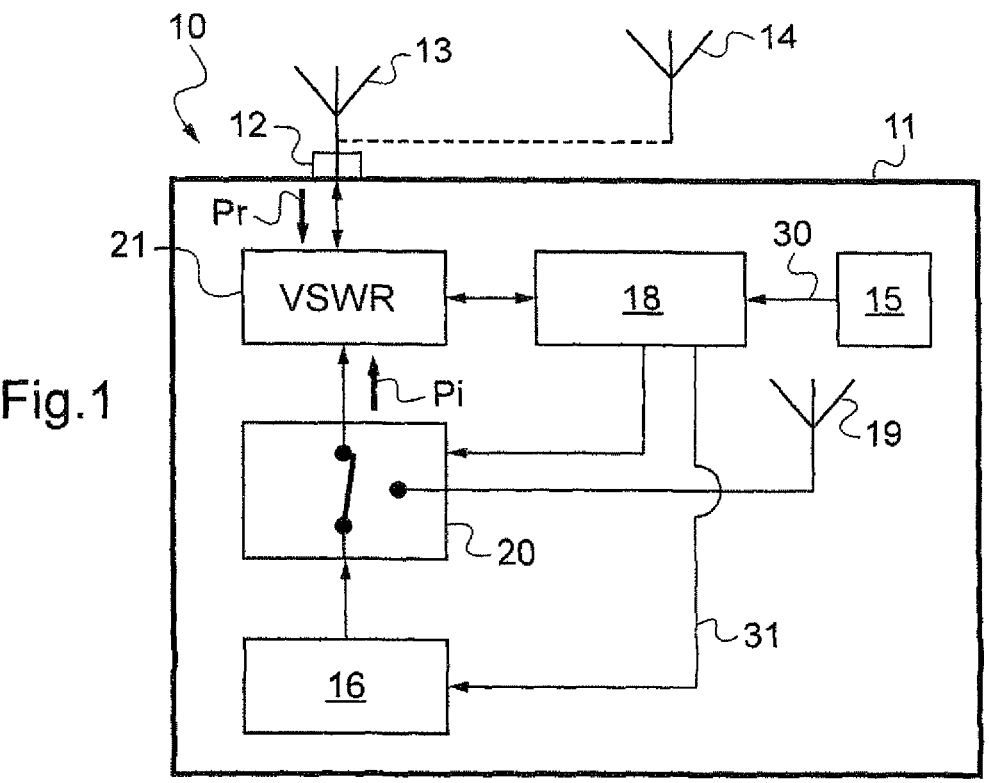
FIG. 1 is a block diagram showing the main components of a beacon of the invention in a configuration for transmitting a distress signal via an antenna external to the housing of the beacon.
Figure 2:
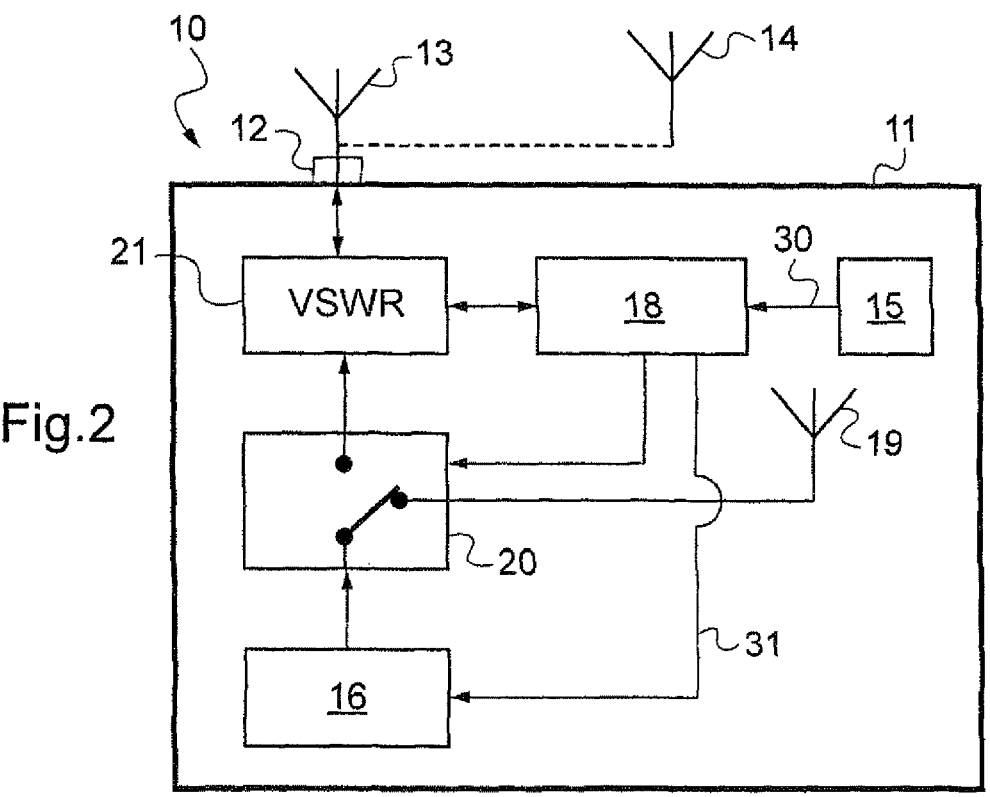
FIG. 2 is a block diagram of the FIG. 1 beacon in a configuration for transmitting a distress signal via the antenna that is internal to the housing of the beacon.

With reference to FIGS. 1 and 2 in particular, the beacon 10 comprises a housing 11 fitted with a connector 12 for connecting the beacon to an antenna (13 or 14) external to the housing: either an antenna 13 secured to the fuselage of a helicopter, or a portable auxiliary antenna 14 on board the helicopter and suitable for being connected to the portable beacon 10 by a person on board who has observed that the antenna 13 has been damaged or by a person who has left helicopter, taking the beacon and the auxiliary antenna.

Inside the housing 11, the beacon includes an impact sensor 15 such as a piezoelectric accelerometer, a transmitter circuit 16 for transmitting distress signals in a suitable format (in terms of amplitude, duration, modulation, and frequency, in particular), and a detection and control member 18 that is connected to the sensor 15 and to the transmitter 16 via respective connections 30, 31.

The member 18, such as a microprocessor circuit, is programmed to trigger operation of the transmitter when an impact is detected.

Inside the housing, the beacon further includes an incorporated antenna 19, a changeover switch 20 connected between the transmitter 16 and the connector 12, and also between the transmitter 16 and the incorporated antenna 19, and a member 21 that is sensitive both to the electromagnetic power Pi that is delivered towards the connector and to the electromagnetic power Pr that is returned by the connector.

The incorporated antenna may be a slot antenna.

The sensitive member 21 is connected to or incorporated in the detector and control member 18, and it is connected between the changeover switch 20 and the connector 12. The member 21 is thus sensitive to the voltage standing wave ratio VSWR in the transmission line connecting the outlet from the changeover switch to the connector.

The detection and control member 18 is connected to the changeover switch and it is arranged (in particular it is programmed) to cause the signals delivered by the transmitter to be applied either to the external antenna 13 or 14, or else to the incorporated antenna 19, depending on the state of, or the level detected by, the sensitive member 21.

The detection and control member 18 is also arranged to monitor the state of the sensitive member 21 at regular time intervals (after an incident has been detected). The detection and control member 18 is arranged in particular to compare the standing wave ratio VSWR with a determined value at regular intervals, after an incident has been detected.

Figure 3:
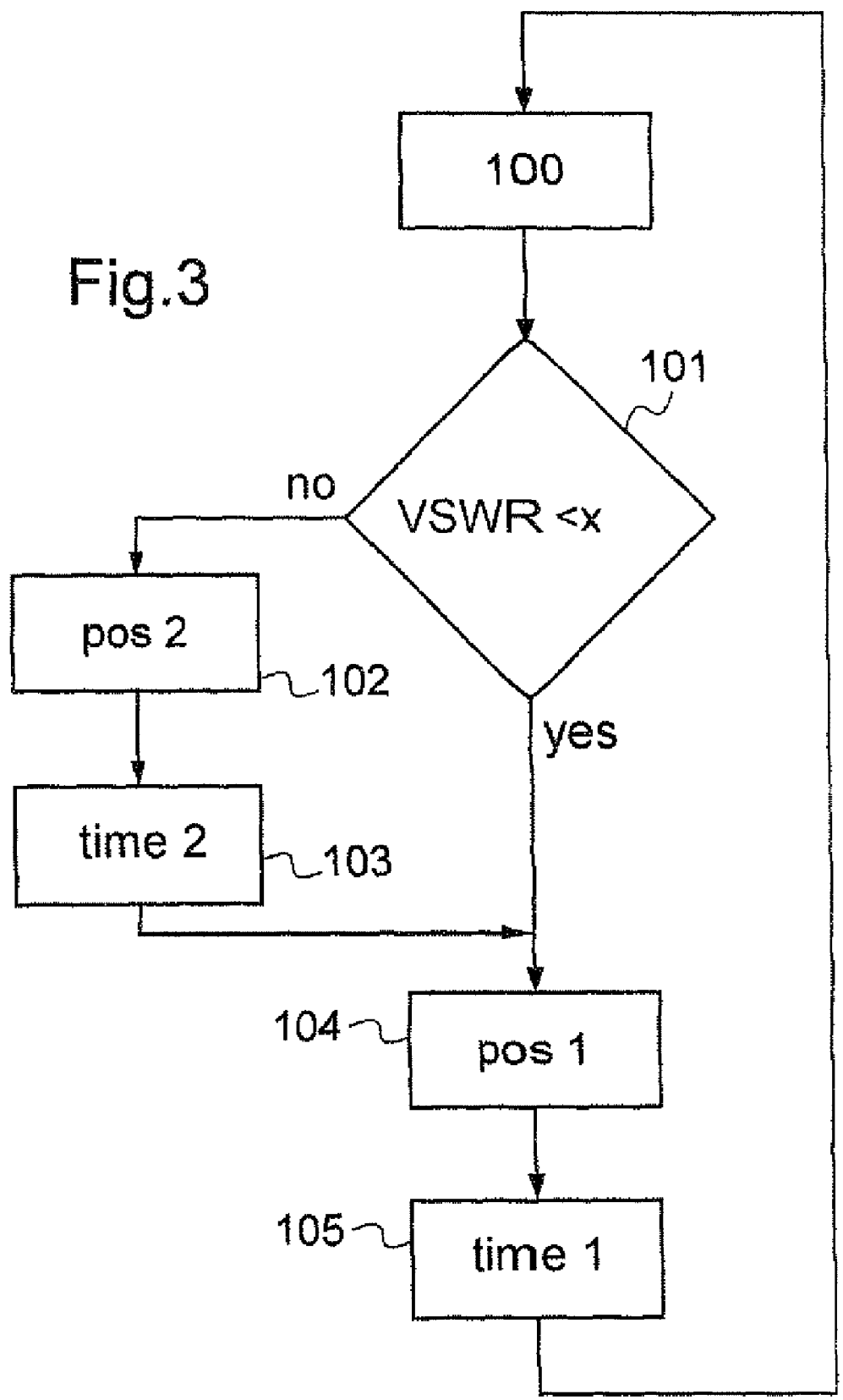
FIG. 3 is a simplified flow chart showing the method of monitoring and adapting the impedance of the transmission line for conveying distress signals to the connector for the external antenna, and the timed changeover command acting between the two states/positions of the changeover switch of the beacon of the invention.

As shown in FIG. 3, the detection and control member 18 is also programmed to maintain the changeover switch in an unchanging state or position (pos1 or pos2 corresponding respectively to FIG. 1 and to FIG. 2) for a determined duration (time1, time2): after a command for causing the changeover switch 20 (FIGS. 1 and 2) to change over to position pos1 (step 104) or to position pos2 (step 102), the VSWR value is monitored again (step 100) and then said value is compared with the determined value x (step 101), but only after a predetermined duration has elapsed, respectively the duration time1 (step 105) or the duration time2 (step 103).

In accordance with an aspect of the invention, the antenna incorporated in the beacon is used for transmitting a distress signal only if the external antenna is damaged or disconnected. Such damage or disconnection can be detected by measuring the VSWR on the transmission line between the changeover switch and the transmitter:

when the value of the VSWR is less than a predetermined value x, e.g. 3, then the control unit 18 causes the changeover switch 20 to be changed over to, or to be kept in, the position pos1 that corresponds to the configuration shown in FIG. 1, in which it is the external antenna that is used for transmitting the distress signal provided by the transmitter, with the incorporated antenna 19 then not being used; or on the contrary, when the value of the VSWR is greater than the predetermined value x, the control unit 18 causes the switch 20 to change over to, or to be kept in, the position pos2 that corresponds to the configuration shown in FIG. 2, in which the incorporated antenna 19 is used for transmitting the distress signal provided by the transmitter, the external antenna 13 or 14 then not being used.

The voltage standing wave ratio is defined as follows:

$$VSWR = \frac{1 + \sqrt{\frac{Pr}{Pi}}}{1 - \sqrt{\frac{Pr}{Pi}}}$$

where Pr corresponds to the return power (from the connector 12 to the changeover switch 20), and Pi corresponds to the incident power (from the changeover switch 20 to the connector 12).

When an antenna is not matched to the impedance of the transmitter, a fraction of the signal is returned to the transmitter. An ideally-adjusted transmitter and antenna pair does not lead to any loss of power, in which case the VSWR is equal to 1, since Pr is zero. In contrast, if the external antenna is disconnected from the transmitter, then all of the power is returned towards the transmitter (Pr=Pi), thereby giving a VSWR having a value that is theoretically infinite.

Thus, when the VSWR exceeds the value x, that means either that the external antenna has been broken or that the connection between the transmitter and the external antenna has been broken; when the unit 18 detects this excess value, it then activates the antenna that is internal to the beacon via the unit 18 and the changeover switch 20.

By means of the invention, in the event of a crash, transmission of the distress signal is independent of the following events:

breaking of the external antenna;
breaking a coaxial cable connecting the connector the beacon to the external antenna; and
inability of the people on board the aircraft to recover and connect the transmitter to the portable (auxiliary) external antenna.

In addition, the logic for activating the changeover switch by the control unit 18 in the event of the distress signal being activated by a person on board the aircraft acting manually on the beacon causes transmission to take place preferably via the fixed antenna 13 (so long as the beacon has not been extracted from the aircraft): a distress signal is thus obtained that is of good quality regardless of circumstances. Changeover to the antenna 19 incorporated in the beacon takes place only when the beacon is separated from the helicopter or when the external antenna (fixed main antenna or portable auxiliary antenna) is not functioning.

What is claimed is:

1. An emergency beacon (10) for a rotorcraft, the beacon comprising a housing (11) fitted with a connector (12) for connecting the beacon to an antenna (13, 14) external to the housing, the beacon (10) being portable for recovering in the event of a crash comprising, inside the housing, a power supply device for the beacon, an incident sensor (15), a transmitter (16), and a detection and control member (18) that is connected to the sensor (15) and to the transmitter (16) and that is arranged to trigger operation of the transmitter in the event of an incident being detected, the beacon further including, inside the housing:

- an incorporated antenna (19);
- a changeover switch (20) inserted between the transmitter and the connector, and also between the transmitter and the incorporated antenna; and
- a sensitive member (21) that is sensitive to the electromagnetic power Pi conveyed to the connector and the electromagnetic power Pr returned from the connector, which sensitive member (21) is connected to or incorporated in the detection and control member (18);
- and wherein the detection and control member (18) is connected to the changeover switch and is arranged to cause the signals provided by the transmitter to be delivered to the external antenna or else to the incorporated antenna, depending on the state of the sensitive member (21); said detection and control member (18) being programmed to monitor the state of the sensitive member (21) at regular time intervals after an incident has been detected, said sensitive member (21) measuring the voltage standing wave ratio VSWR in a transmission line connecting an outlet of the changeover switch to the connector.

2. A beacon (10) according to claim 1, in which the detection and control member (18) is arranged to compare the standing wave ratio VSWR with a determined value at regular intervals after detecting an incident.

3. A beacon (10) according to claim 1, in which the detection and control member (18) is arranged to keep the state or the position (pos1, pos2) of the changeover switch unchanged for a determined duration (time1, time2).

4. A beacon (10) according to claim 1, in which the incorporated antenna is a slot antenna.

5. A beacon (10) according to claim 1, in which the transmitter is arranged to transmit signals at least two or three frequencies.

6. A beacon (10) according to claim 1, in which the transmitter is arranged to transmit signals at least one of the following frequencies: 121.5 MHz; 243 MHz; and 406.025 MHz.

* * * * *